June 4, 1968    H. HURVITZ    3,386,287
FLOW DETECTORS
Filed Feb. 20, 1964    2 Sheets-Sheet 1
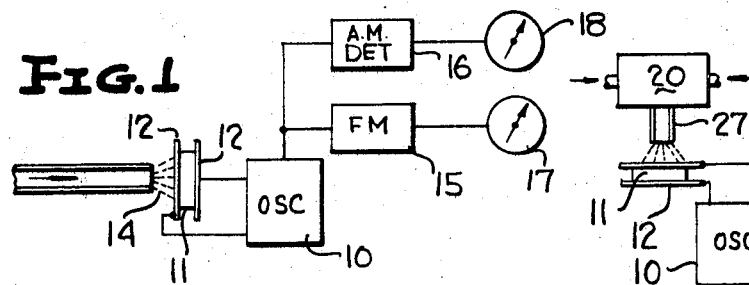
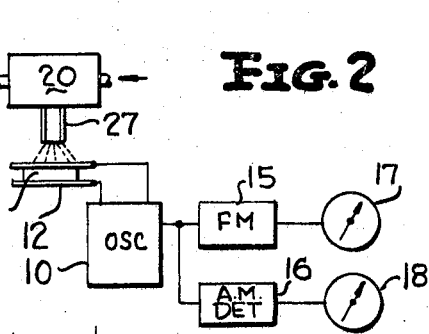
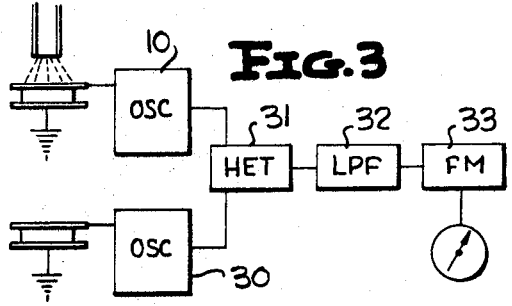
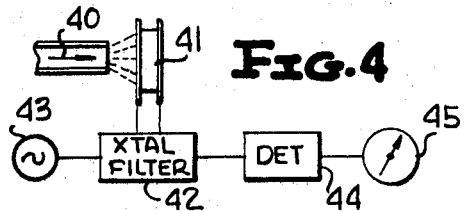
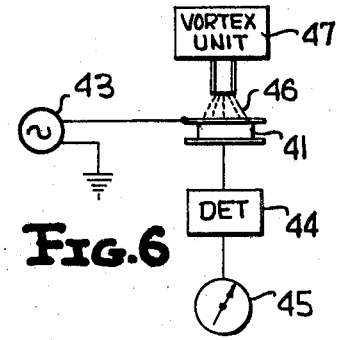
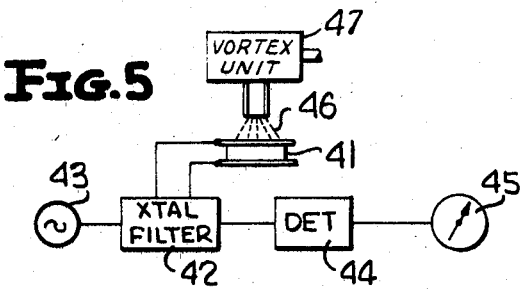
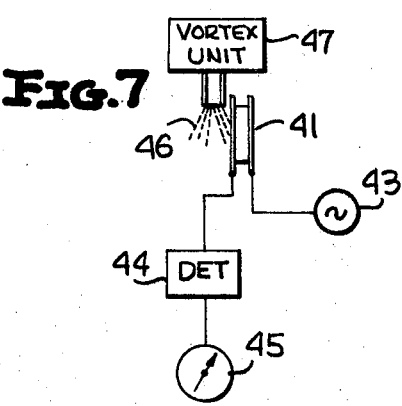
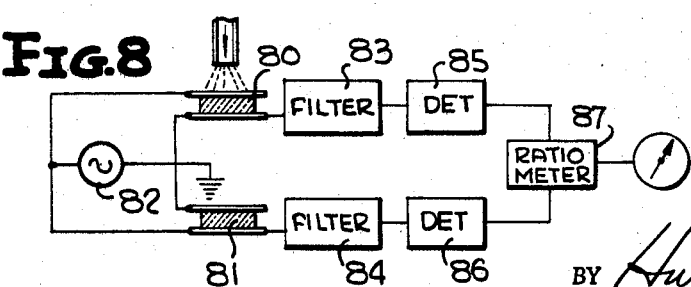
INVENTOR
HYMAN HURVITZ
BY Hurvitz & Rose
ATTORNEYS June 4, 1968  H. HURVITZ  3,386,287
FLOW DETECTORS
Filed Feb. 20, 1964  2 Sheets-Sheet 2
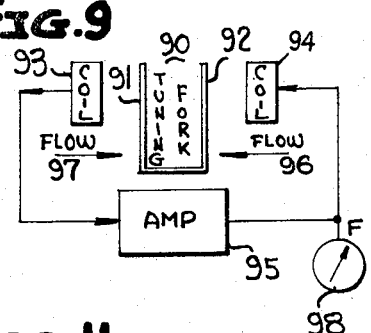
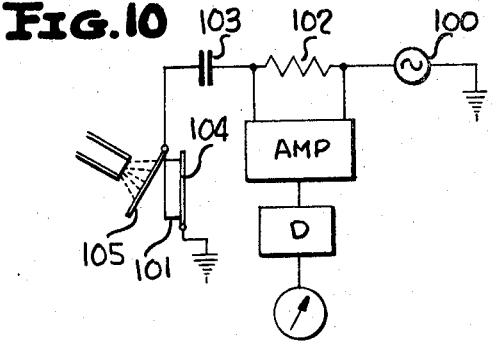
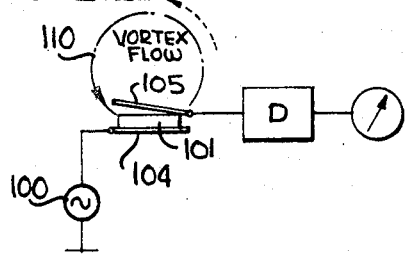
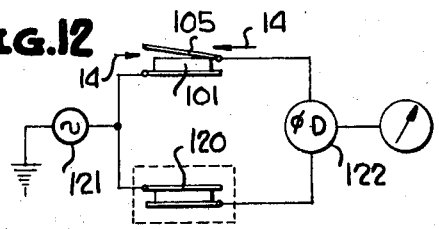
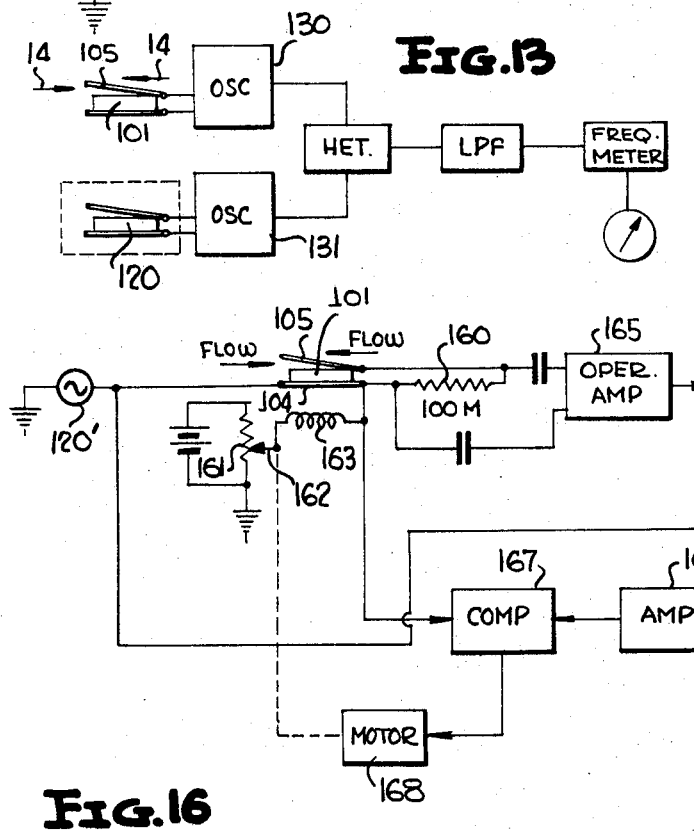
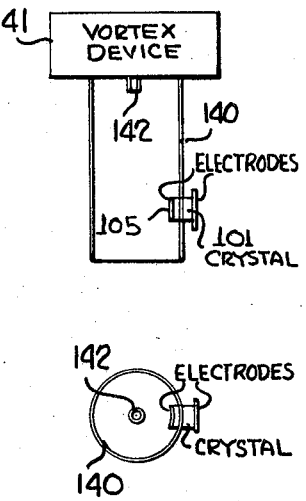
INVENTOR
HYMAN HURVITZ
BY Hurvitz & Rose
ATTORNEYS

United States Patent Office
3,386,287
Patented June 4, 1968

3,386,287
FLOW DETECTORS
Hyman Hurvitz, 822 Warner Bldg.,
Washington, D.C. 20004
Filed Feb. 20, 1964, Ser. No. 346,201
4 Claims. (Cl. 73—194)

The invention relates generally to flow detectors, and more particularly to flow detectors which operate by varying the resonant frequency of a mechanically oscillating device or devices to detect mass flow.

Briefly describing the invention, in a preferred embodiment, a flow of fluid, such as air, is caused to impinge on a piezoelectric crystal. The air may flow in rotation, i.e., as a vortex, or it may flow linearly. In either event, the impingement of the flow against the crystal has several effects, any one of which may be employed as a measure of mass flow. The crystal will vary in respect to resonant frequency and in respect to Q. The crystal may be the frequency controlling element of an oscillator or it may be driven in a filter configuration. If driven, change of frequency will change phase of output and amplitude of output. If part of an oscillator its frequency and amplitude of output may be varied. These various effects may be readily measured, either directly or by comparison with a corresponding device not subject to the effect of flow of fluid.

It may be desired to measure direction and mass flow rate of a linear flow, or sense of rotation and mass flow rate of rotary flow. For these purposes a deflectable electrode may be employed, on the crystal. Flow in one sense will cause increased deflection of the electrode and flow in the other sense decreased deflection. The location of the electrode with respect to the crystal establishes one of the capacities of the crystal, and hence, its resonant frequency.

Since a crystal may have a resonant frequency of 1 mc. and a Q of 10,000, or more, and since a variation of frequency of 1 c.p.s. in 1 mc. is easy to detect, by comparison techniques, the present system is extremely sensitive and can detect extremely weak flows. Moreover the high Q of the crystal, with or without inertia of the deflectable electrode, provide an integrating effect which is extremely valuable in eliminating noise, in a flow having some turbulence.

It is accordingly, an object of the invention to provide a novel fluid flow detector.

It is another object of the invention to provide a system for detecting laminar flow to the exclusion of turbulent flow and noise.

It is another object of the invention to provide a novel fluid mass flow detector which operates by varying the Q or the resonant frequency, or both, of a mechanically vibrating element.

It is still a further object of the invention to provide a system for measuring sense and magnitude of fluid mass flow.

The above and still further objects, features and advantages of the present invention will become apparent upon consideration of the following detailed description of one specific embodiment thereof, especially when taken in conjunction with the accompanying drawings, wherein:

FIGURES 1–16 are diagrammatic representations of various forms of the invention.

In FIGURE 1, 10 is an oscillator, having a crystal 11 with the usual plated electrodes 12 for determining its frequency of oscillation. If a jet of fluid 14 is directed against one face of the crystal, the latter will change (1) its resonant frequency and (2) its Q, due to (a) compression and (b) damping. Change of frequency of oscillation 10 can be measured by a frequency meter 15, and amplitude of output, which depends on Q by an amplitude detector 16, display or read out being by meters 17 and 18, respectively.

In FIGURE 2, the principle of FIGURE 1 is applied to a vortex amplifier 20 having a central outlet part 27 from which fluid issues in a rotating stream. It is desired to measure rate of rotation. If the flow is not rotating the fluid impinges on one small spot of the crystal, directly, and a reading of $f$ and Q can be made for this condition. As rotation increases the area of impingement increases and the momentum of the particles in the direction of the crystal decreases. The latter effect occurs because the flow of any molecule of the fluid is spiral, and the pitch of the spiral varies and the angle of impingement on the crystal varies as rate of rotation increases and the stream therefore spreads to form a cone of ever broadening base. There occurs therefore a decrease of total pressure as rate of rotation increases, assuming total mass flow constant.

In FIGURE 3, the frequency of oscillator 10 is compared wtih that of a like oscillator 30, which is not affected by fluid flow. Difference frequency is obtained by a heterodyne detector 31 and low pass filter 32, connected to frequency meter 33. Differences of one part in a million are readily detected.

In FIGURE 4 fluid flow 40 impinges on crystal 41. The latter is part of a crystal filter 42 (of conventional configuration), resonant, in the absence of flow 40, to the output of oscillator 43. As the flow 40 increases the resonant frequency of filter 41 increases, so that it is no longer driven at resonance and provides reduced output. This is detected by detector 44, and measured by meter 45.

FIGURE 5 is analogous to FIGURE 4, but flow 40 is replaced by rotary flow 46 from a vortex amplifier 47.

FIGURE 6 is like FIGURE 5 except in that crystal 41 is itself the entire filter.

FIGURE 7 is like FIGURE 6 except that the axis of the rotating flow in vortex 46 is parallel to the plane of crystal 41, so that increased pressure occurs for increasing rotary rate, as the flow angle diverges with increasing rate of rotation.

FIGURE 8 is a comparison system, i.e., crystal 80 is subjected to flow while crystal 81 is not, these crystals being of precisely the same frequency normally and being driven in parallel from oscillator 82 and being frequency determined elements of filters 83, 84, respectively. The amplitudes of outputs of the filters are detected in detectors 85, 86 and the detected outputs compared in ratio meter 87.

In FIGURE 9 the resonant element is a tuning fork oscillator 90, including tines 91, 92, and pickup 93 and drive 94 connected by amplifier 95, in a conventional configuration except that the tines are of slightly different lengths. This provides a way of measuring direction of flow, as 96, or 97. The oscillator will operate at a frequency intermediate the tine frequencies. As one tine or the other is damped, frequency will change toward the natural frequency of the undamped tine. Since the tines may be only 1 c.p.s. or less apart at a natural frequency of say 1000 c.p.s., frequency meter 98 must be an accurate counter, and as such serves also as an integrator, averaging out effects of noise or turbulence.

In FIGURE 10 oscillator 100 drives crystal 101 via a resistance 102 and a capacitor 103, all in series. The crystal 101 includes one normal plated electrode 104 and one electrode 105 which is secured to the crystal at one edge only, the remainder of the electrode being free to pivot on that end and being resilient (at least at the joint). For example, electrode 105 may be a thin leaf spring, or a flap of gold leaf. The proximity of the electrode 105 to the crystal 101 determines capacity of the crystal equivalent circuit, and therefore tunes the crystal. A wide range of tuning is attainable in this way. Signal existing across resistance 102 is amplified and detected for amplitude variation as the frequency of the crystal departs from that of source 100.

The principle of FIGURE 10 is employed in FIGURE 11 to detect sense of rotation and amplitude of flow of vortex output, by causing the vortex flow circumference to exist parallel to the face of the crystal. The electrode and crystal may be built into the wall of a vortex confining tube 110, in which the vortex is constrained to flow axially, and which confines the vortex so that its entire flow impinges on electrode 105.

Flow in one sense will increase the angle the electrode 105 makes with the crystal, and flow in opposite sense will decrease the angle, and extent of increase or decrease will be a function of mass flow.

In FIGURES 12 and 13, frequencies are compared, of crystals 101, with crystals 120 which are not affected by flow. In FIGURE 12, the two crystals are filters and are driven in parallel from source 121. Comparison is made of phases in phase meter 122.

In FIGURE 13, the crystals are frequency determining elements of two oscillators 130, 131, which are compared by heterodyning, as in FIGURE 3.

The technique of FIGURES 12 and 13 can be applied to measuring rotary output of a vortex device, as in FIGURE 14. Here a tube 140 extends from the vortex unit 141, coaxially of its opening or output port 142. The tube 140 may have so small a diameter that flow from port 142 will fill the tube 140 whether or not there is rotation of fluid. Crystal 101 is mounted in an opening of the wall of the tube with electrode 105 internally and the remainder of the crystal 101 outside. The electrode 105 extends circumferentially and deflects radially. It follows that components of axial fluid flow will have no effect but that rotary flow will tend to deflect the electrode 105. The techniques of FIGURES 10, 11, 12, 13 may be employed, and hence are not illustrated.

In FIGURE 16 is shown a feedback system for measuring deflection of electrode 105 without measuring frequency as an end product.

The electrodes 105 and 104 are connected by a very large resistance 160 (10 to 100 M), which does not affect crystal Q. A variable source of dc voltage, including a potentiometer 161 having a slider 162 is connected through an R.F. choke 163 to electrode 104. The potential of slider 162 communicates itself to electrode 105. Thus both electrodes 104, 105 constitute an electroscope, and 105 may be very light and thin, as in a gold leaf electroscope. The divergence of the leaves, 104, 105 can be set by adjusting 162.

The AC voltage across the crystal electrodes, derived from source 120', at the resonant frequency of the crystal, and the direct output of source 120' are compared in a phase detector 122. An operational amplifier 165 serves to couple, and can be an integrator or differential or a straight amplifier, depending on the character of indication required. The crystal and its controls are an integrator, and the amplifier 165 can differentiate to derive an integrated function, or integration time can be added, if desired. The output of the phase detector 122 is amplified in amplifier 166 and compared with the voltage of slider 162 in comparator 167, which in turn controls a motor 168 which tends to equalize the inputs to comparator 167, thus completing a servo loop.

If the system is set for zero, rotary flow, any rotary flow will tend to deflect electrode 105 in one sense or the other, depending on direction of flow. The servo loop will bring the electrode 105 back to its original position, whereupon the position of slider 162 will measure flow, including sense of flow.

The system is sensitive in that flow force is compared with electrostatic force on leaves of an electroscope.

While I have described and illustrated one specific embodiment of my invention, it will be clear that variations of the details of construction which are specifically illustrated and described may be resorted to without departing from the true spirit and scope of the invention as defined in the appended claims.

I claim:
1. A vortex system comprising:
a pure fluid vortex device,
said pure fluid vortex device including an egress orifice issuing rotating fluid from said pure fluid vortex device,
a cantilever element mounted in the path of said rotating issuing fluid and arranged to respond motionally only to rotational energy of said rotating issuing fluid, and
a piezoelectric element, said cantilever element constituting an electrode of said piezoelectric element so that the position of said cantilever element establishes the resonant frequency of said piezoelectric element.

2. A measuring device, comprising:
first and second oscillatory systems,
each responsive to applied pressure to change its resonance characteristic and thereby its phase transfer characteristic, said phase transfer characteristics being different each from the other as a function of said pressure,
means applying a common signal to said systems, and
means measuring the phase difference of the responses of said systems to said common signal.

3. The combination according to claim 2 wherein is provided means applying fluid pressure to one only of said oscillatory systems.

4. In a system for measuring velocity and sense of fluid flow capable of flowing in either of two opposite senses, a piezoelectric crystal having a flat face, a flat electrode oriented at an angle to said flat face to form a plane angle, said flat electrode being movable with respect to said face to vary said plane angle, said piezoelectric crystal being oriented with respect to said fluid flow such that in one of said senses said fluid flow is directed toward the apical line of said plane angle.

References Cited
UNITED STATES PATENTS

| | | | |
|---|---|---|---|
| 1,933,735 | 11/1933 | Hund | 310—9.3 |
| 2,079,540 | 5/1937 | Wolfskill | 310—9.3 |
| 2,171,243 | 8/1939 | McKesson | 310—9.3 |
| 2,266,316 | 12/1941 | Martin et al. | 73—194 |
| 2,800,647 | 7/1957 | Baerwald et al. | 340—234 |
| 2,809,520 | 10/1957 | Richard | 73—194 |
| 2,898,477 | 8/1959 | Hoestery | 307—88.5 |
| 3,116,639 | 1/1964 | Bird | 73—194 |
| 3,199,347 | 7/1965 | Moss | 73—194 |
| 2,315,756 | 4/1943 | Warner | 73—398 X |
| 2,878,454 | 3/1959 | Leming et al. | 310—8.1 X |
| 3,203,237 | 8/1965 | Ogren | 73—194 |
| 3,237,447 | 3/1966 | McKeown | 324—56 X |

RICHARD C. QUEISSER, *Primary Examiner.*

L. R. FRANKLIN, C. A. RUEHL, *Assistant Examiners.*